United States Patent [19]

Franklin et al.

[11] Patent Number: 4,756,210
[45] Date of Patent: * Jul. 12, 1988

[54] TORQUE CONVERTER BYPASS FOR AN AUTOMATIC TRANSMISSION MECHANISM

[75] Inventors: James M. Franklin, Dearborn Heights; Robert W. Nichols, South Lyon, both of Mich.

[73] Assignee: Ford Motor Company, Dearborn, Mich.

[*] Notice: The portion of the term of this patent subsequent to Jun. 3, 2003 has been disclaimed.

[21] Appl. No.: 894,077

[22] Filed: Aug. 5, 1986

Related U.S. Application Data

[63] Continuation of Ser. No. 635,862, Jul. 30, 1984, abandoned.

[51] Int. Cl.$^4$ ............................................. F16H 47/08
[52] U.S. Cl. ........................................ 74/731; 74/688; 192/3.28
[58] Field of Search ................. 74/677, 688, 731, 732, 74/760, 762, 761; 192/3.28, 58 B, 106.1

[56] References Cited

U.S. PATENT DOCUMENTS

| | | | |
|---|---|---|---|
| 2,889,715 | 6/1982 | DeLorean | 74/688 |
| 2,932,220 | 4/1960 | Nash | 74/732 |
| 3,024,668 | 3/1962 | Kronogard et al. | 74/688 |
| 3,314,307 | 4/1967 | Egbert | 74/688 |
| 3,355,966 | 12/1967 | Boehm | 74/688 |
| 3,359,827 | 12/1967 | Chapman et al. | 74/677 |
| 3,362,510 | 1/1968 | Nash | 188/90 |
| 3,398,604 | 8/1968 | Hause | 74/688 |
| 3,772,939 | 11/1973 | Hause | 74/677 |
| 3,986,413 | 10/1976 | Stockton | 74/688 |
| 4,224,837 | 12/1978 | Croswhite | 74/688 |
| 4,289,044 | 9/1981 | Dorpmund et al. | 74/688 |
| 4,317,510 | 3/1982 | Staub, Jr. | 192/48.3 |
| 4,331,044 | 5/1982 | Bookout et al. | 74/688 |
| 4,398,436 | 8/1983 | Fisher | 74/388 |
| 4,408,501 | 10/1983 | Liang et al. | 74/688 |
| 4,413,535 | 11/1983 | Hobbs | 74/688 |
| 4,413,536 | 11/1983 | Whitney et al. | 74/869 |
| 4,417,484 | 11/1983 | Gaus et al. | 74/688 |
| 4,423,803 | 1/1984 | Malloy | 192/3.29 |
| 4,454,786 | 6/1984 | Stockton | 74/688 |
| 4,473,145 | 9/1984 | Bopp | 192/3.29 |
| 4,505,365 | 3/1985 | Bopp | 192/58 B |
| 4,513,634 | 4/1985 | Ohtsuka | 74/688 |
| 4,592,250 | 6/1986 | Plasencia et al. | 74/688 |

FOREIGN PATENT DOCUMENTS 2127915  4/1984  United Kingdom ............... 192/3.28

Primary Examiner—Leslie A. Braun
Assistant Examiner—Dwight G. Diehl
Attorney, Agent, or Firm—Donald J. Harrington; Keith L. Zerschling

[57] ABSTRACT

A hydrokinetic, multiple ratio torque converter transmission having planetary gear ratio elements that establish a hydrokinetic torque path in low ratio and reverse gear and a bypass torque path in intermediate gear and third gear including a torque converter and an overrunning coupling wherein the intermediate gear and third gear is characterized by a mechanical torque flow or a viscous shear torque flow path, the third gear being a partial hydrokinetic regenerative torque flow path.

6 Claims, 3 Drawing Sheets

| DRIVE SELECTOR | | CLUTCH ENGAGED | | | | | |
|---|---|---|---|---|---|---|---|
| | | B | CL₁ | CL₂ | CL₃ | OWC₁ | OWC₂ |
| PARK | | | | | | X | |
| REVERSE | | | | X | X | X | @ |
| NEUTRAL | | | | | | | |
| "D" | 1ST | | X | | | X | |
| | 2ND | X | X | | | X | |
| | 3RD | | X | X | | | α |
| "2" | 1ST | | X | | X | X | |
| | 2ND | X | X | | X | | |
| "1" | 1ST | X | X | | X | X | @ |

@ = CLUTCH ENGAGED IN COAST
α = CLUTCH DISENGAGED IN COAST

TORQUE CONVERTER BYPASS FOR AN AUTOMATIC TRANSMISSION MECHANISM

This is a continuation of application Ser. No. 635,862, filed July 30, 1984 and now abandoned.

BRIEF DESCRIPTION OF THE INVENTION

Our invention relates to a hydrokinetic torque converter transmission having planetary gearing that establishes three mechanical drive ratios as torque are delivered to the gearing from the converter turbine to a driven shaft, the latter being adapted to be connected to the traction wheels of a wheeled vehicle. The improvements of our invention are capable of being used in a transmission system such as that disclosed in U.S. patent application Ser. No. 557,294, filed Oct. 11, 1983, by David B. Plasencia and Stewart P. Maxwell (U.S. Pat. No. 4,592,250 dated June 3, 1986). That application is assigned to the assignee of this invention.

The gearing arrangement described in the disclosure of Plasencia and Maxwell comprises a hydrokinetic torque converter in combination with a compound planetary gear set wherein a centrifugal converter lockup clutch is engaged when the input speed for the gearing, which corresponds to the turbine speed of the converter, reaches a predesigned value. The centrifugally actuated clutch bypasses the converter to provide a mechanical torque flow path during intermediate speed ratio and third speed or high speed ratio operation. During acceleration from a standing start with transmission gearing in condition for the low speed ratio, the converter functions as an open converter and the clutch is disengaged.

The improvement of our invention comprises a mechanical damper or a viscous coupling to establish a torque flow path that bypasses the converter during intermediate speed ratio and high speed ratio operation. An overrunning coupling is used in combination with the mechanical damper or viscous coupling and the converter so that the converter is capable of functioning as an open converter during acceleration from a standing start. The converter operates also as an open converter during operation in the reverse drive mode.

This specification describes a first embodiment that includes a mechanical damper and a second embodiment that includes a viscous coupling. In each case the torque converter functions as an open converter during operation in the low speed ratio. The mechanical damper together with the cooperating overrunning coupling establish a mechanical torque flow path that effectively bypasses the converter.

By using the improvements of our invention it is thus possible to achieve greater energy transfer efficiency than a hydrokinetic torque converter transmission having the same torque capacity. Open converter operation is achieved in third speed ratio when smoothness in torque delivery is important.

PARTICULAR DESCRIPTION OF THE INVENTION

Figures 1, 2:
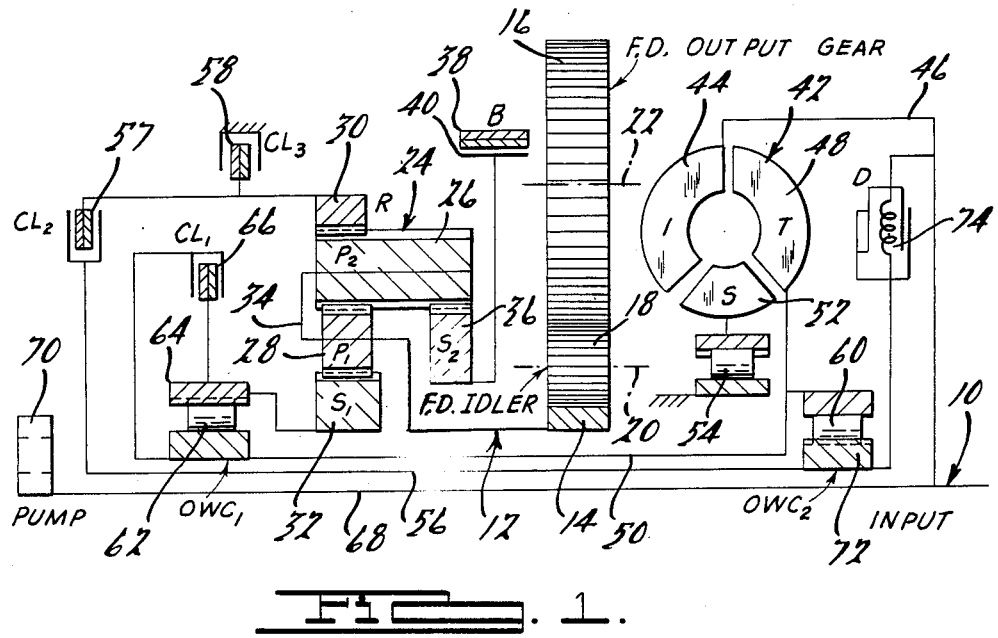
FIG. 1 is a schematic representation of a converter and gearing arrangement capable of embodying the improvements of my invention. In this embodiment of the invention a mechanical damper system is used in combination with an overrunning coupling and a hydrokinetic converter.
FIG. 2 is a chart that shows the clutch and brake engagement and release pattern for the embodiment of FIG. 1 as well as for the second embodiment of FIG. 3.

In FIG. 1 the crankshaft of an internal combustion vehicle engine is adapted to be connected to torque input shaft 10. A torque output shaft 12 serves to drive a final drive gear 14 connected to a final drive output gear 16 by a final drive idler pinion 18 rotatably journalled for rotation about fixed axis 20. Final drive output gear 16 is journalled for rotation about fixed axis 22. Gear 16 is adapted to be connected to a suitable drive system to the ring gear of a differential and axle assembly.

A compound planetary gear unit 24 comprises a long planet pinion set 26 and a short planet pinion set 28, the pinions of each set engaging each other. Ring gear 30 engages along the planet pinion set 26 and sun gear 32 engages short planet pinion set 28. Planet pinion sets 26 and 28 are journalled on a common carrier 34 which is connected drivably to sleeve shaft 12. Sun gear 36 engages short planet pinion set 26 and it is adapted to be braked by brake band 38 that surrounds brake drum 40 connected to the sun gear 36.

A hydrokinetic torque converter 42 includes a bladed impeller 44 connected through a drive shell and drive plate assembly 46 to the input shaft 10. A bladed turbine 48 located in the torus circuit of which the impeller 44 forms a part is connected to turbine driven shaft 50. Bladed stator 52 is located in the torus circuit of the converter between the flow exit section of the turbine and the flow entrance section of the impeller. It is mounted for rotation in the direction of rotation of the impeller on a stator hub by means of an overrunning brake 54.

Intermediate sleeve shaft 56 extends concentrically through shaft 50. It is adapted to be connected to a ring gear 30 through a selectively engageable friction clutch 57. Ring gear 30 is adapted to be braked selectively by friction brake 58. Turbine 48 delivers torque to the intermediate sleeve shaft 56 through overrunning clutch 60 which in FIG. 1 also carries the legend OWC$_2$. Turbine driven shaft 50 is adapted to deliver torque to the sun gear 32 through overrunning clutch 62 which also carries in FIG. 1 the legend OWC$_1$. The outer race 64 for the clutch 62 is connected directly to the sun gear 32. Turbine driven shaft 50 is adapted to be connected to the outer race 64 through a selectively engageable friction clutch 66.

A centrally disposed drive shaft 68 extends through sleeve shaft 56. It directly connects input shaft 10 with a positive displacement pump 70. Input shaft 10 is connected to the input race 72 of the overrunning clutch 60 by means of a vibration damper and cushion assembly 74.

The clutches and brakes of the embodiment described in FIG. 1 can be applied and released in sequence to obtain each of three forward driving ratios and a single reverse ratio. The engagement and release pattern to achieve the various drive ratios is illustrated in the chart of FIG. 2. The clutches and brakes identified in FIG. 2 carry the legends B, $CL_1$, $CL_2$, $CL_3$, $OWC_1$ and $OWC_2$. These symbols respectively correspond to brake band 38, selectively engageable clutch 66, selectively engageable clutch 57, selectively engageable brake 58, overrunning coupling 62 and overrunning coupling 60. The symbol "X" in the vertical columns identified by the various clutch and brake symbols indicate when the clutch or brake is applied or active for any particular drive ratio. For example, during reverse drive clutch $CL_1$ and brake $CL_3$ are applied. Overrunning coupling $OWC_1$ is active when the transmission is conditioned for reverse drive when the vehicle is coasting overrunning coupling $OWC_2$ is active. A blank space in the vertical columns of FIG. 2 for any particular drive ratio indicates that the clutch or the brake or the overrunning coupling is inactive or disengaged.

Three drive modes are illustrated in the chart of FIG. 2. These are the "D" drive mode, the "2" drive mode and the "1" drive mode. The control system is capable of selecting the drive modes. The control system will not be described in this specification. The "D" drive mode includes three forward driving ratios identified as first, second and third ratio. If the control system conditions the transmission for operation in the "2" drive mode, only the first two ratios are available. Finally, if the control system conditions the transmission for operation in the "1" drive mode, only the first ratio is available.

If brake "B" is applied, sun gear 36 acts as a reaction point for the planetary gearing. Turbine torque developed by the converter 42 is transferred through turbine shaft 50 and through overrunning clutch 62 to the sun gear 32. With sun gear 36 acting as a reaction member, the carrier 34 is driven with maximum speed reduction.

To achieve a second forward driving ratio, clutch $CL_2$ is applied. The overrunning coupling $OWC_1$ freewheels to permit a nonsynchronous upshift from the first ratio to the second ratio. Drive torque is delivered under these conditions through a mechanical torque flow path that includes the damper 74, the overrunning coupling $OWC_2$ freewheeling to permit this mechanical torque flow path to function. A ratio change from the second speed ratio to the high speed ratio is achieved by engaging both clutches $CL_1$ and $CL_2$ thus effecting a lockup condition in the planetary gearing.

During coast in the first and reverse ratio overrunning coupling $OWC_2$ delivers torque from the direct shaft 50 to the input 10 through the damper 74. Torque is distributed to the shaft 50 through clutch $CL_1$, which is engaged under that coast condition.

Figure 3:
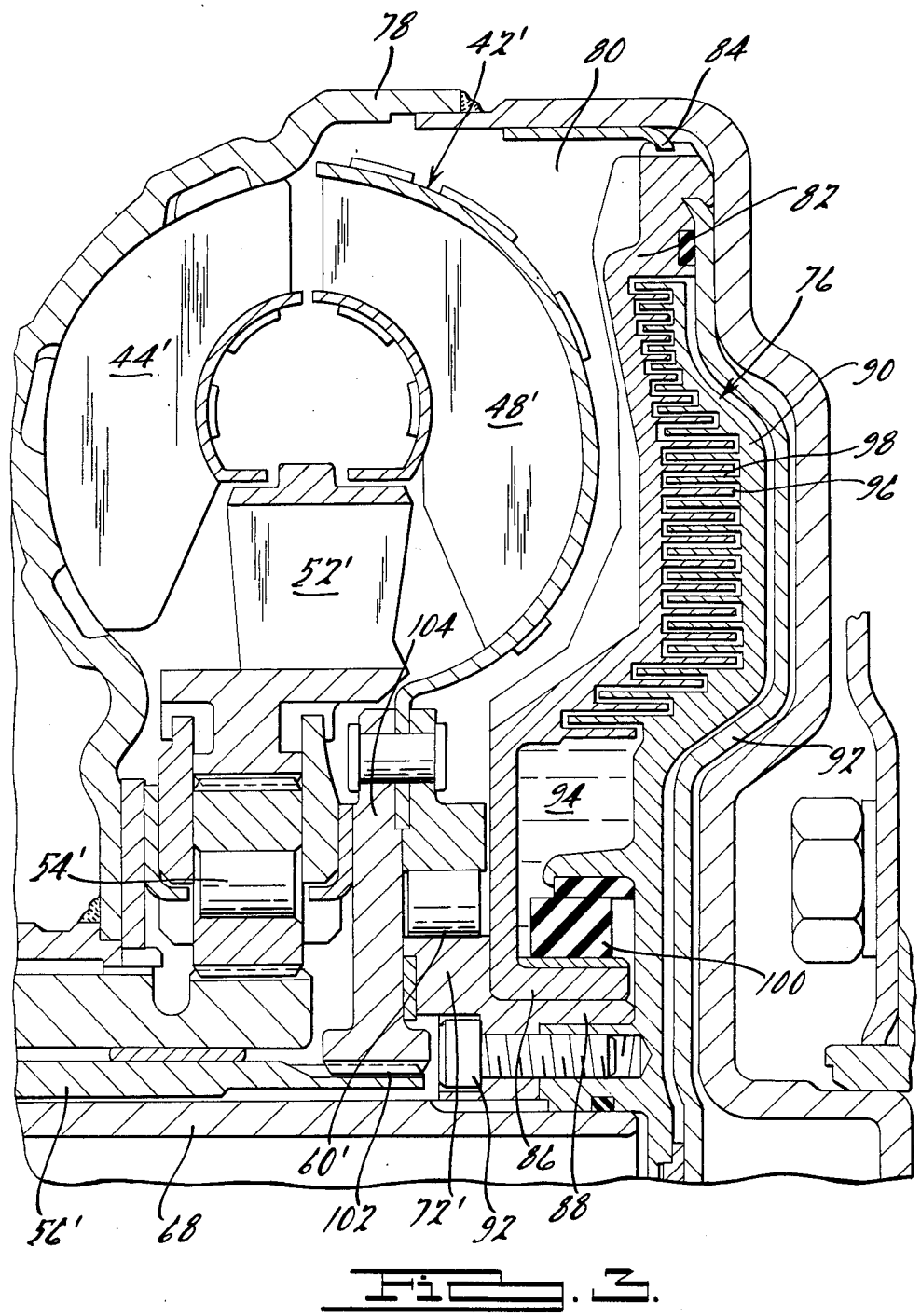
FIG. 3 shows a hydrokinetic torque converter and viscous coupling combination capable of being used in the transmission system schematically shown in FIG. 1.
Figure 4:
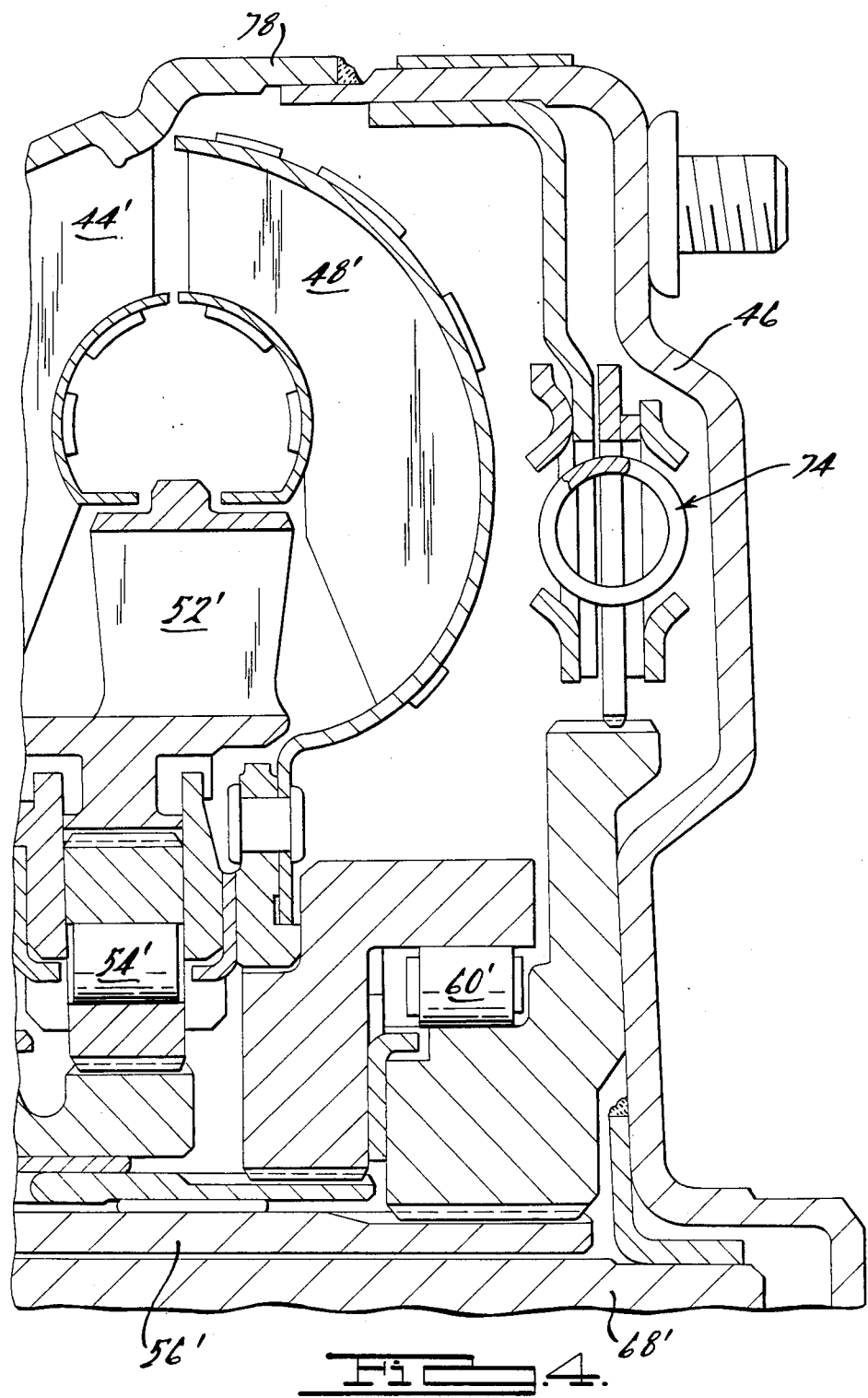
FIG. 4 is a mechanical damper assembly in combination with a hydrokinetic converter and overrunning coupling which corresponds to the converter damper and overrunning coupling illustrated schematically in FIG. 1.

In FIG. 3 I have shown an embodiment that uses a viscous coupling 76 rather than the damper assembly 74. The portions of the embodiment of FIG. 3 that have corresponding portions in the embodiment of FIG. 2 have been identified by similar reference characters although prime notations are added.

The impeller 44' of the torque converter 42' includes an impeller shell 78 that encloses the turbine 48'. The shell 78 defines a cavity 80 on the right hand side of the turbine 48' which is occupied by the viscous coupling 76. The viscous coupling includes a coupling shell 82 that is fixed at its outer margin to the interior of the impeller shell 78 by means of a retainer 84. The shell 82 is circular and is provided with a hub 86 journalled on inner race extension 88 of the overrunning coupling inner race 72'. A companion shell part 92 is secured at its outer margin to the shell part 82. Shell part 90 is secured by bolts 92 to the inner race 72'. Shell parts 90 and 82 define a cavity 94 which is filled with a highly viscous fluid such as a silicon fluid having a viscosity between 30,000 and 100,000 centistokes at 25°. Such fluids are well known and are available commercially. A typical silicone fluid is Dow Corning silicone fluid No. 200.

Shell part 82 is provided with shear plates 96 located in the chamber 94. These plates are interleaved with shear plates 98 formed on the shell part 90. The shear plates 96 and the shear plates 98 are radially positioned, one with respect to the other, and are interleaved, one with respect to the other, to provide maximum shear torque when the shell part 82 rotates relative to shell part 90. Shell part 92 extends radially inwardly between part 90 and the radially inward radial wall of the impeller shell 78. Such devices are well known, an example being Eaton Corp. U.S. Pat. No. 4,473,145, issued Sept. 25, 1984.

A fluid seal 100 isolates the silicone fluid 94 while allowing relative rotation of part 90 with respect to part 82.

The viscous shear forces established by the high viscosity silicon fluid allows transfer of torque from the input shaft 10 to the inner race 72' of the overrunning coupling 60' and to the sleeve shaft 56', the latter being splined at 102 to the turbine hub 104.

The chart of FIG. 2 is effective to describe the clutch engagement and release pattern for the various drive modes and the drive ratios within each mode for the FIG. 3 embodiment except that the torque flow path established by the viscous shear coupling replaces the mechanical torque flow path established by the damper 74 of FIG. 1. During operation in the number "1" drive mode and during reverse drive operation, the torque is delivered entirely through the torque converter. During coast, torque is delivered through the viscous coupling and through the overrunning coupling $OWC_2$ as in the case of the embodiment of FIG. 1.

During operation in the "2" drive mode and the "D" drive mode, the torque delivery is split between the torque converter and the viscous coupling. The proportion of the split depends upon the viscous coupling capacity. During second gear ratio operation when coasting, all of the torque is delivered through the viscous coupling.

In third gear ratio with the transmission in condition for the "D" drive mode, torque for forward drive operation is split between the torque converter and the viscous coupling. The overrunning coupling $OWC_2$ is engaged. During operation in the third gear coasting drive mode, a regenerative torque flow path occurs which tends to disengage the overrunning clutch. Approximately half the braking torque is delivered regeneratively. The damper impeller torque is 1.5 times engine torque. The regenerative torque flow path from sun gear 32 is established as overrunning coupling $OWC_2$ ties sun gear 32 to ring gear 30, thereby eliminating hydrokinetic torque through the converter. All torque then is transmitted through either the damper or the viscous coupling. In third gear, during the mode when the vehicle wheels are providing drive torque, the overrunning coupling $OWC_2$ unlocks. Torque flows from the ring gear 30 through either the damper or the viscous coupling to the engine input, and torque converter torque is transmitted to sun gear 32 to balance the gearset torques.

Having thus described a preferred embodiment of our invention, what we claim and desire to secure by U.S. Letters Patent is:

1. A hydrokinetic torque converter mechanism for an automotive vehicle driveline adapted to deliver driving torque from a driving shaft to an output shaft;
 a compound planetary gear unit having two input elements, a reaction element, separate torque input shafts connected respectively to said input elements;
 said hydrokinetic unit comprising a bladed impeller and a bladed turbine, the impeller being connected to said driving shaft, said turbine being connected to one of said input shafts;
 a viscous shear coupling means having a first coupling member connected to said impeller and a second coupling member connected to the other of said input shafts for connecting said second input shaft to said driving shaft; and
 an overrunning coupling between the torque output side of said viscous shear coupling and said first input shaft.

2. The combination as set forth in claim 1 wherein:
 said compound planetary gear unit comprises a ring gear, first and second sun gears, a carrier, a first set of pinions carried by said carrier in meshing engagement with the first sun gear and said ring gear, a second set of pinions engaged with said second sun gear and with said first set of pinions;
 first clutch means for connecting selectively said first input shaft to said second sun gear, second clutch means for selectively connecting said second input shaft to said ring gear; and
 first and second brake means for anchoring respectively the first sun gear and said ring gear to effect a second gear drive mode and reverse drive mode respectively.

3. The combination as set forth in claim 2 wherein said transmission comprises final drive gearing situated between said hydrokinetic unit and said compound planetary gear unit, said final drive gearing comprising a final drive input gear connected to said output shaft and a final drive output gear adapted to be connected to vehicle traction wheels.

4. The combination as set forth in claim 2 wherein said first clutch means for connecting said first input shaft to said second sun gear includes a selectively engageable friction clutch and second overrunning coupling arranged in parallel relationship, said friction clutch effecting coasting torque delivery therethrough and said second overrunning coupling effecting torque delivery from said driving shaft to said sun gear during first gear drive.

5. The combination as set forth in claim 4 wherein said transmission comprises final drive gearing situated between said hydrokinetic unit and said compound planetary gear unit, said final drive gearing comprising a final drive input gear connected to said output shaft and a final drive output gear adapted to be connected to vehicle traction wheels.

6. The combination as set forth in claim 1 wherein said transmission comprises final drive gearing situated between said hydrokinetic unit and said compound planetary gear unit, said final drive gearing comprising a final drive input gear connected to said output shaft and a final drive output gear adapted to be connected to vehicle traction wheels.

* * * * *